United States Patent
Wang et al.

(10) Patent No.: US 10,122,281 B2
(45) Date of Patent: Nov. 6, 2018

(54) POWER CONVERSION DEVICE FOR CANCELLING LEAKAGE CURRENT

(71) Applicant: FUJI ELECTRIC CO., LTD., Kawasaki-shi, Kanagawa (JP)

(72) Inventors: Qichen Wang, Hino (JP); Satoru Fujita, Tachikawa (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 144 days.

(21) Appl. No.: 15/262,789

(22) Filed: Sep. 12, 2016

(65) Prior Publication Data

US 2016/0380546 A1 Dec. 29, 2016

Related U.S. Application Data (63) Continuation of application No. PCT/JP2014/072112, filed on Aug. 25, 2014.

(51) Int. Cl.
*H02M 7/217* (2006.01)
*H02M 3/335* (2006.01)
(Continued)

(52) U.S. Cl.
CPC ......... *H02M 3/33507* (2013.01); *H02M 1/44* (2013.01); *H02M 7/217* (2013.01); *H02M 7/487* (2013.01); *H02M 2001/123* (2013.01)

(58) Field of Classification Search
CPC ............................ H02M 7/217; H02M 3/33507
(Continued)

(56) References Cited

U.S. PATENT DOCUMENTS 3,450,981 A * 6/1969 Fletcher .................... G05F 3/06
   323/206
7,170,761 B2 * 1/2007 Yasumura ........... H02M 1/4241
   363/17

(Continued)

FOREIGN PATENT DOCUMENTS

JP   2003-153542 A   5/2003
JP   2007-143349 A   6/2007
(Continued)

OTHER PUBLICATIONS

Translation documents (3) for JP2013-055797A, including 1 document for drawings, 1 document for claim translation and 1 document for detailed description translation.*

*Primary Examiner* — Adolf Berhane
*Assistant Examiner* — Nusrat Quddus
(74) *Attorney, Agent, or Firm* — Rabin & Berdo, P.C.

(57) ABSTRACT

A power conversion device includes a potential variation suppression portion having first and second ground capacitors and a reactor, for suppressing a potential variations at an A point at which switching elements and are connected together and at a B point in a bidirectional switch. The potential variation suppression portion suppresses potential variation at the A point by cancelling a first leakage current, which flows due to the potential variation at the A point at the positive and negative polarities of an alternating current voltage, with a first compensating current flowing via the reactor and ground capacitor, and suppresses the potential variation at the B point by cancelling a second leakage current, which flows due to the potential variation at the B point at the negative polarity of the alternating current voltage, with a second compensating current flowing via the reactor, a switch, and the second ground capacitor.

13 Claims, 10 Drawing Sheets

(51) Int. Cl.
*H02M 1/44* (2007.01)
*H02M 7/487* (2007.01)
*H02M 1/12* (2006.01)

(58) Field of Classification Search
USPC ...... 363/15, 17, 21.02–21.18, 44–48, 52–53, 363/123, 125–127
See application file for complete search history.

(56) References Cited

U.S. PATENT DOCUMENTS

| | | | |
|---|---|---|---|
| 8,644,036 B2* | 2/2014 | Sato | H02M 3/33523 363/21.04 |
| 9,531,298 B2* | 12/2016 | Wang | H02M 7/483 |
| 2011/0050135 A1 | 3/2011 | Higuchi et al. | |

FOREIGN PATENT DOCUMENTS

| | | |
|---|---|---|
| JP | 2009-148078 A | 7/2009 |
| JP | 2011-120376 A | 6/2011 |
| JP | 2013-055797 A | 3/2013 |
| JP | 2013-110829 A | 6/2013 |
| WO | WO-2009/110354 A1 | 9/2009 |

\* cited by examiner

BACKGROUND ART

FIG. 6

BACKGROUND ART

FIG. 7

BACKGROUND ART

FIG. 8

BACKGROUND ART

POWER CONVERSION DEVICE FOR CANCELLING LEAKAGE CURRENT

TECHNICAL FIELD

The present invention relates to a technology which reduces a disturbance voltage resulting from a switching operation of a power conversion device.

BACKGROUND ART

Figure 5:
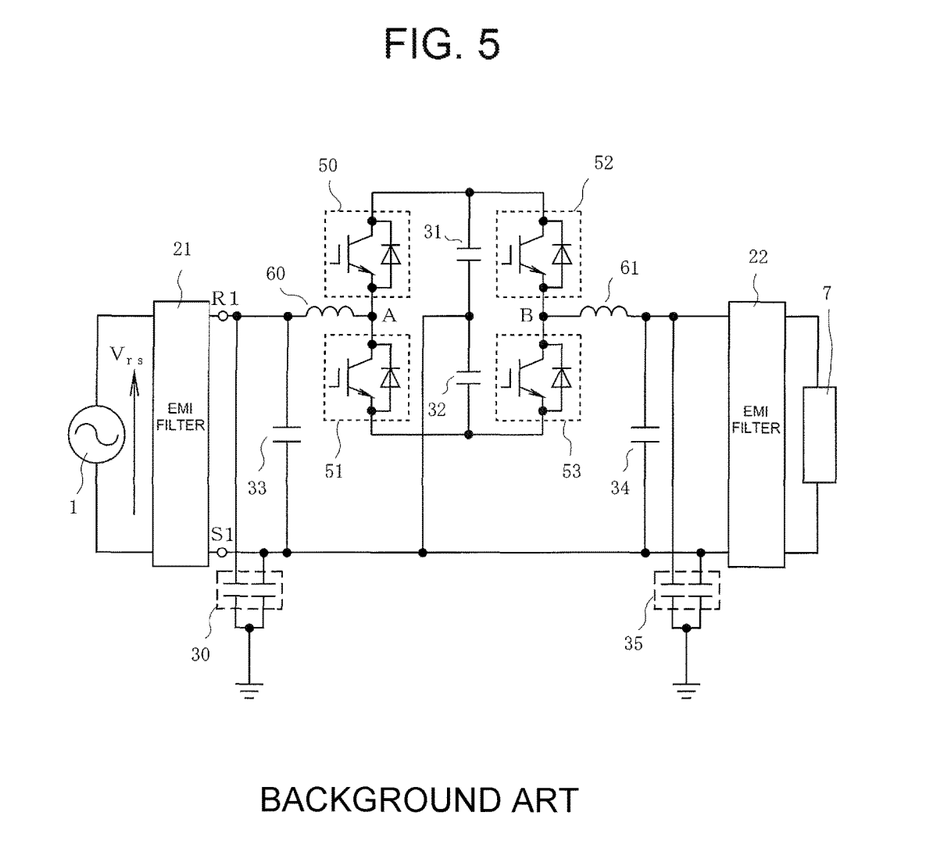
FIG. 5 is a circuit diagram showing a heretofore known double converter.

FIG. 5 is a circuit diagram of a double converter including a first converter which converts an alternating current voltage to a direct current voltage and a second converter which converts a direct current voltage to an alternating current voltage.

In FIG. 5, the two ends of a single phase alternating current power source 1 are connected to alternating current input terminals R1 and S1 via an EMI (Electro Magnetic Interference) filter 21. A ground capacitor 30 is connected between the alternating current input terminals R1 and S1 and a ground point, and a capacitor 33 is connected between the alternating current input terminals R1 and S1.

The alternating current input terminal R1 is connected to an A point, which is the connection point of semiconductor switching elements 50 and 51, via a reactor 60.

The series circuit of capacitors 31 and 32 and the series circuit of switching elements 52 and 53 are each connected in parallel to the series circuit of the switching elements 50 and 51, and the connection point of the capacitors 31 and 32 is connected to the alternating current input terminal S1. When the connection point of the switching elements 52 and 53 is taken to be a B point, a reactor 61 and a capacitor 34 are connected in series between the B point and the alternating current input terminal S1. Also, an EMI filter 22 is connected across the capacitor 34, and a load 7 is connected across the EMI filter 22. Furthermore, a ground capacitor 35 is connected between the two ends of the capacitor 34 and a ground point.

FIG. 5 shows a case in which an IGBT (Insulated Gate Bipolar Transistor) is used as each switching element 50 to 53, but there is also a case in which a MOSFET (Metal-Oxide-Silicon Field Effect Transistor) is used in place of an IGBT, or there is also a case in which a diode is used in place of the switching element 50.

In the double converter, an alternating current voltage is converted to a direct current voltage by an on/off operation of the switching elements 50 and 51 configuring the first converter, and the capacitors 31 and 32 are charged with the direct current voltage, while a direct current voltage is converted to an alternating current voltage by an on/off operation of the switching elements 52 and 53 configuring the second converter, and the alternating current voltage is supplied to the load 7.

Herein, the potentials at the A point and B point which are the connection points of the switching elements vary at a high frequency as a result of a switching operation of the switching elements 50 to 53.

Figure 6:
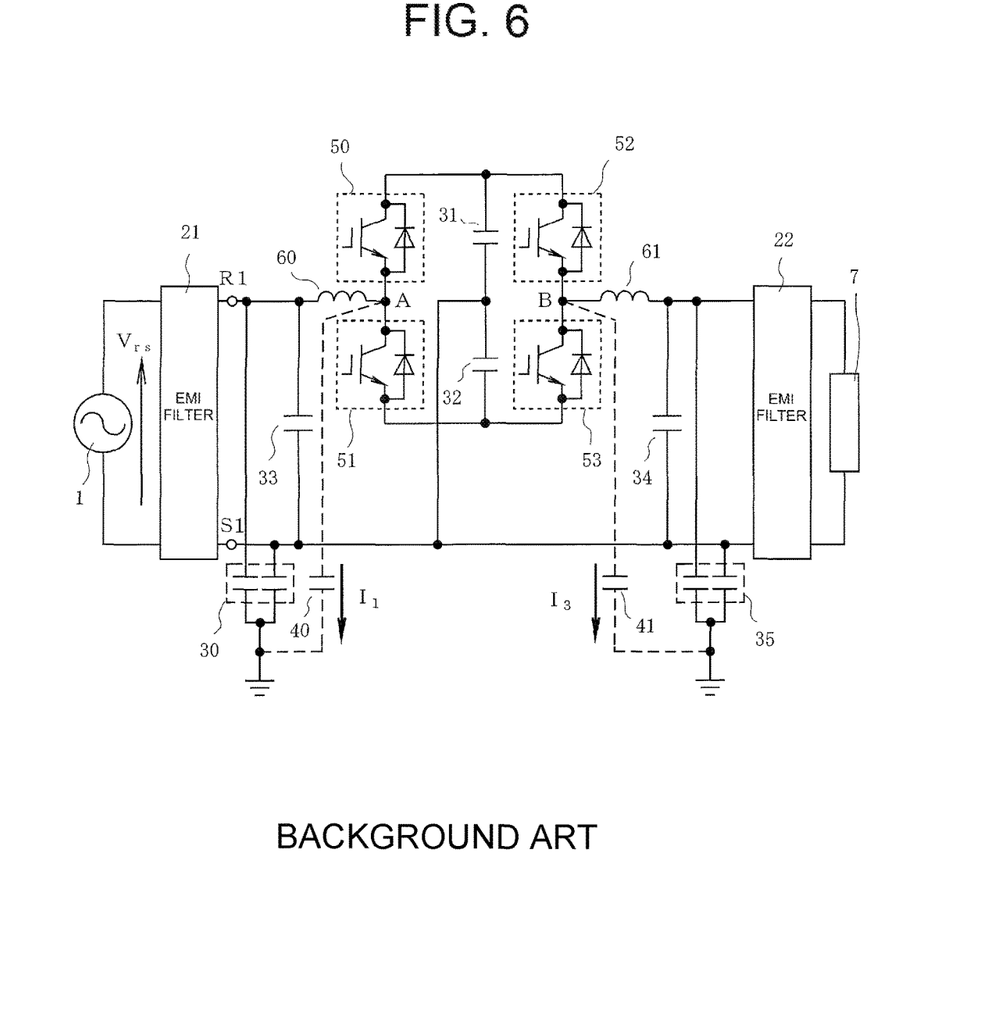
FIG. 6 is a circuit diagram for illustrating the paths of leakage currents in FIG. 5.

As shown in FIG. 6, parasitic capacitances 40 and 41 exist between portions of the circuit, for example, the A point and B point and their respective ground points. Therefore, a high frequency leakage current $I_1$ flowing via the parasitic capacitance 40 and ground capacitor 30, or a high frequency leakage current $I_3$ flowing via the parasitic capacitance 41 and ground capacitor 35, circulates through the circuit as a result of potential variations at the A point and B point, thereby generating a disturbance voltage caused by common mode noise.

With this kind of power conversion device, there is a case in which an operation at a high switching frequency is required in order to achieve an increase in efficiency and a reduction in size, and there is also a case in which switching operates at a high frequency of, for example, several hundreds of [kHz]. Under this kind of high switching frequency, there is a tendency that as the time rate of change of potential (dv/dt) resulting from a switching operation increases, and the high frequency leakage currents increase, the disturbance voltage also increases eventually.

The EMI filters 21 and 22 function, as common mode noise filters for removing the noise generated by the switching operation, for external devices which share the alternating current power source 1. Consequently, by making the EMI filters 21 and 22 larger in capacity, it is possible to enhance a disturbance voltage reduction effect, but there is the problem of causing an increase in the size and cost of parts and the device.

A drastic measure for reducing the disturbance voltage is to reduce the size of the kinds of parasitic capacitances 40 and 41 shown in FIG. 6 to the minimum. Therefore, various ideas for, for example, the layout of parts and the route of wires have heretofore been devised, but all the ideas have limitations, and it is very difficult to completely remove the parasitic capacitance.

As an example of a heretofore known technology of reducing the disturbance voltage, the invention described in PTL 1 is known.

Figure 7:
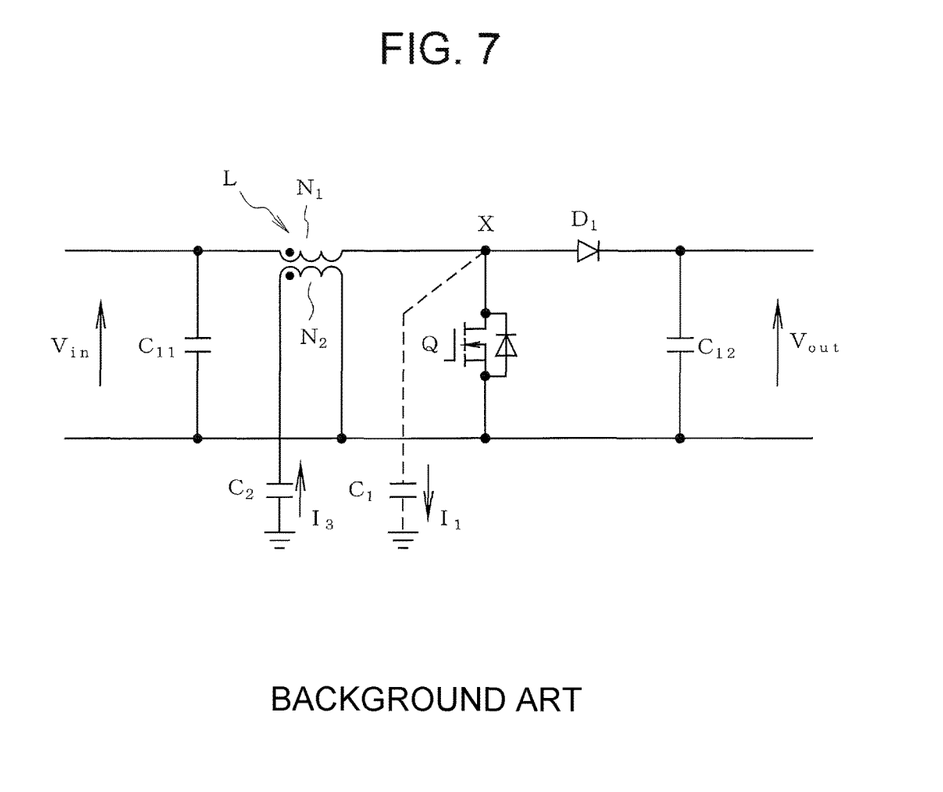
FIG. 7 is a circuit diagram showing the main portion of the heretofore known technology described in PTL 1.

FIG. 7 is a circuit diagram showing the main portion of the invention described in PTL 1. In FIG. 7, Q is a semiconductor switching element, L is a reactor, $N_1$ is a main winding, $N_2$ is an auxiliary winding, $C_{11}$ and $C_{12}$ are capacitors, $D_1$ is a diode, $C_1$ is a parasitic capacitance existing between an X point and a chassis (ground point) of a device, $C_2$ is a capacitor connected between the auxiliary winding and the chassis, $V_{in}$ is an input voltage, and $V_{out}$ is an output voltage.

As an operation of FIG. 7, when the potential at the X point varies as a result of an on/off operation of the switching element Q, and the leakage current $I_1$ flows to the chassis via the parasitic capacitance $C_1$, the current $I_3$, which is equal in size and opposite in direction to the current $I_1$, flows through the auxiliary winding $N_2$ via the capacitor $C_2$.

Herein, when the numbers of turns of the main winding $N_1$ and auxiliary winding $N_2$ are taken to be $N_1$ and $N_2$ which are the same as their respective reference signs, and the capacitance values of the parasitic capacitance $C_1$ and capacitor $C_2$ are taken to be $C_1$ and $C_2$ which are the same as their respective reference signs, by setting $C_1 \cdot N_1 = C_2 \cdot N_2$, it is possible to cancel the leakage current $I_1$ resulting from the potential variation at the X point, and thus possible to reduce the disturbance voltage.

CITATION LIST

Patent Literature

PTL 1: JP-A-2003-153542 (Paragraphs [0026] to [0034], FIG. 2, and so on)

SUMMARY OF INVENTION

Technical Problem

Meanwhile, recently, a multilevel power conversion device has been provided for the purpose of achieving higher efficiency.

Figure 8:
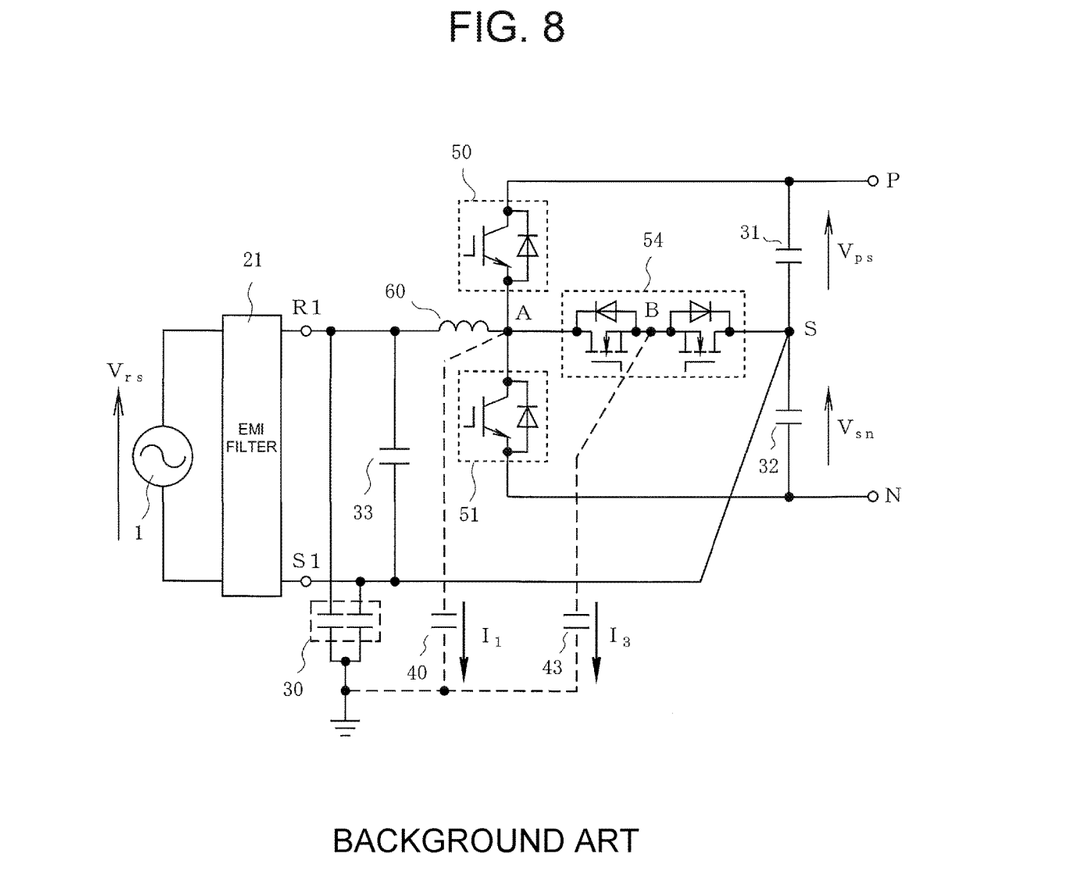
FIG. 8 is a circuit diagram of a heretofore known three-level converter.

For example, the power conversion device shown in FIG. 8 is a three-level AC-DC conversion device (a three-level converter), which generates three direct current potentials $V_{ps}$, $V_{sn}$, and 0 [V] from an alternating current input voltage $V_{rs}$.

The description that follows regarding FIG. 8 focuses on the differences between FIG. 8 and FIG. 6. In FIG. 8, a bidirectional switch 54 having, for example, an anti-series circuit of two low breakdown voltage MOSFETs is connected between the A point which is the connection point of the switching elements 50 and 51 and an S point which is the connection point of the capacitors 31 and 32 (the connection point of the two MOSFETs is taken to be a B point). Also, 40 is a parasitic capacitance between the A point and the ground point, and 43 is a parasitic capacitance between the B point and the ground point.

In the three-level converter, when the two ends of the series circuit of the capacitors 31 and 32 are taken to be positive and negative output terminals P and N, it is possible to generate three direct current potentials ($V_{ps}$, $V_{sn}$, and 0 [V]) from a P point and N point, which are the direct current output terminals, and the S point by an on/off operation of the switching elements 50 and 51 and bidirectional switch 54.

Figure 9:
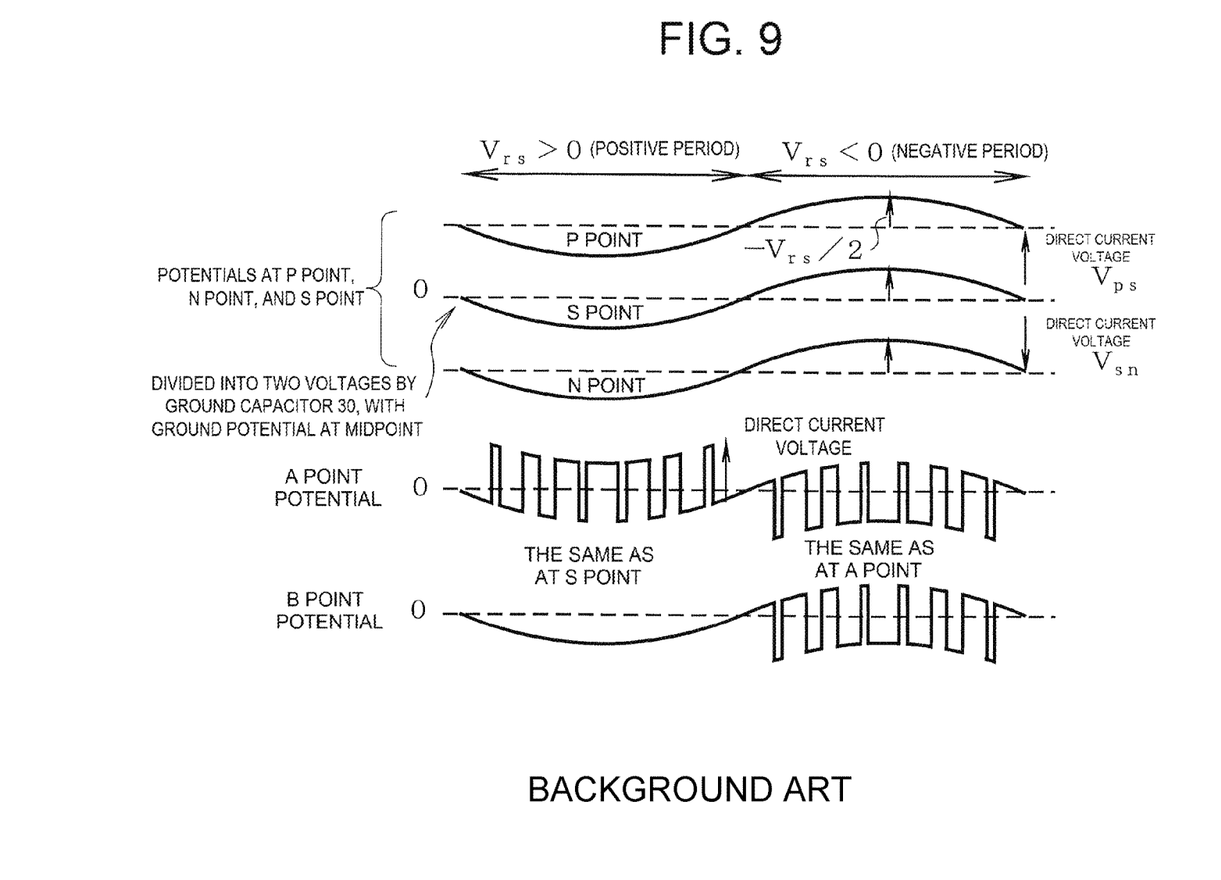
FIG. 9 is an illustration of the potentials at points in FIG. 8.

In the three-level converter of FIG. 8, as shown in FIG. 9, the potentials at the A point and B point change in accordance with the polarity of the alternating current input voltage $V_{rs}$.

That is, the potential at the A point varies between an S point potential ($-V_{rs}/2$) and a P point potential ($V_{ps}-V_{rs}/2$) in the period in which the alternating current input voltage $V_{rs}$ is positive, and varies between the S point potential ($-V_{rs}/2$) and an N point potential ($V_{sn}-V_{rs}/2$) in the period in which the alternating current input voltage $V_{rs}$ is negative. Also, the potential at the B point becomes the same as the S point potential ($-V_{rs}/2$) in the period in which the alternating current input voltage $V_{rs}$ is positive, and varies in the same way as at the A point, that is, between the S point potential ($-V_{rs}/2$) and the N point potential ($V_{sn}-V_{rs}/2$) in the period in which the alternating current input voltage $V_{rs}$ is negative.

The potentials at the A point and B point vary in the same pattern in the period in which the alternating current input voltage $V_{rs}$ is negative, as heretofore described, but the potentials at the A point and B point vary in different patterns in the period in which the alternating current input voltage $V_{rs}$ is positive. Consequently, leakage currents $I_1$ and $I_3$ flowing through the parasitic capacitances 40 and 43 change in different patterns in accordance with the polarity of the alternating current input voltage $V_{rs}$.

Therefore, the leakage currents $I_1$ and $I_3$ cannot be cancelled at the same time with the method of reducing the potential variation at one point in the circuit by using capacitors and auxiliary windings, as in the previously described PTL 1.

Therefore, an object of the invention lies in providing various kinds of power conversion devices in which a disturbance voltage is reduced by reliably cancelling leakage currents circulating through a circuit via parasitic capacitances and a ground point.

Solution to Problem

In order to achieve the object, the invention is directed to a power conversion device, such as a converter or an inverter, which converts power supplied from a power source by a switching operation of a plurality of semiconductor switching elements and supplies the power to a load, in which the device has a first connection point at which first and second semiconductor switching elements are connected together and a second connection point at which third and fourth semiconductor switching elements are connected together, a pattern of potential variation at the first connection point at one polarity (for example, the positive polarity) of an alternating current voltage applied to the first connection point differing from a pattern of potential variation at the second connection point.

Further, the invention is characterized by including a voltage potential variation suppression device which injects a voltage in order to suppress the voltage potential variations at the first connection point and the second connection point. The voltage potential variation suppression portion suppresses the potential variation at the first connection point by cancelling a first leakage current, which flows to a ground point from the first connection point via a parasitic capacitance due to the voltage potential variation at the first connection point at first and second opposite polarities (that is, the positive and negative polarities) of the alternating current voltage, with a first compensating current flowing via a reactor and a first ground capacitor connected to the first connection point. The voltage potential variation suppression device furthermore operates so as to suppress the potential variation at the second connection point by cancelling a second leakage current, which flows to the ground point from the second connection point via a parasitic capacitance due to the potential variation at the second connection point at the second polarity (for example, the negative polarity) of the alternating current voltage, with a second compensating current flowing via the reactor and a second ground capacitor.

The second connection point is a connection point of two semiconductor switching elements in a bidirectional switch in which the two semiconductor switching elements are connected in anti-series, and the first connection point is connected to one of the semiconductor switching elements configuring the bidirectional switch.

The reactor configuring the potential variation suppression portion includes a main winding, one end of which is connected to the first connection point and the other end of which is connected to one end of an auxiliary winding, and the auxiliary winding, an induced voltage in which is opposite in polarity to that in the main winding, and the other end of the auxiliary winding is connected to the first ground capacitor, and is connected to the first ground capacitor via a switch having a semiconductor switching element or the like. Further, the switch is configured so as to open at the one polarity (for example, the positive polarity) of the alternating current voltage applied to the first connection point and close at the other polarity (likewise, the negative polarity).

In order to operate to open and close the switch, a semiconductor switching element or the like only has to be connected so as to turn on/off in accordance with a polarity of the induced voltage in the auxiliary winding.

The power conversion device according to the invention includes various kinds of converters or inverters which carry out AC-DC conversion, DC-AC conversion, or AC-AC conversion by an operation of the first to fourth semiconductor switching elements.

Advantageous Effects of Invention

According to the invention, even when two connection points of switching elements, the patterns of potential variations at which differ in accordance with the polarity of the alternating current voltage, exist in the power conversion device, it is possible to automatically cancel the leakage currents by an operation of the potential variation suppression portion in accordance with the polarity. Therefore, it is possible to suppress the potential variation at each connection point and reduce a disturbance voltage.

DESCRIPTION OF EMBODIMENTS

Hereafter, a description will be given, along the drawings, of embodiments of the invention. Firstly, FIG. 1A is a circuit diagram of a three-level converter showing a first embodiment of the invention, in which parts having the same functions as in FIG. 8 are given the same reference signs.

Figure 1A:
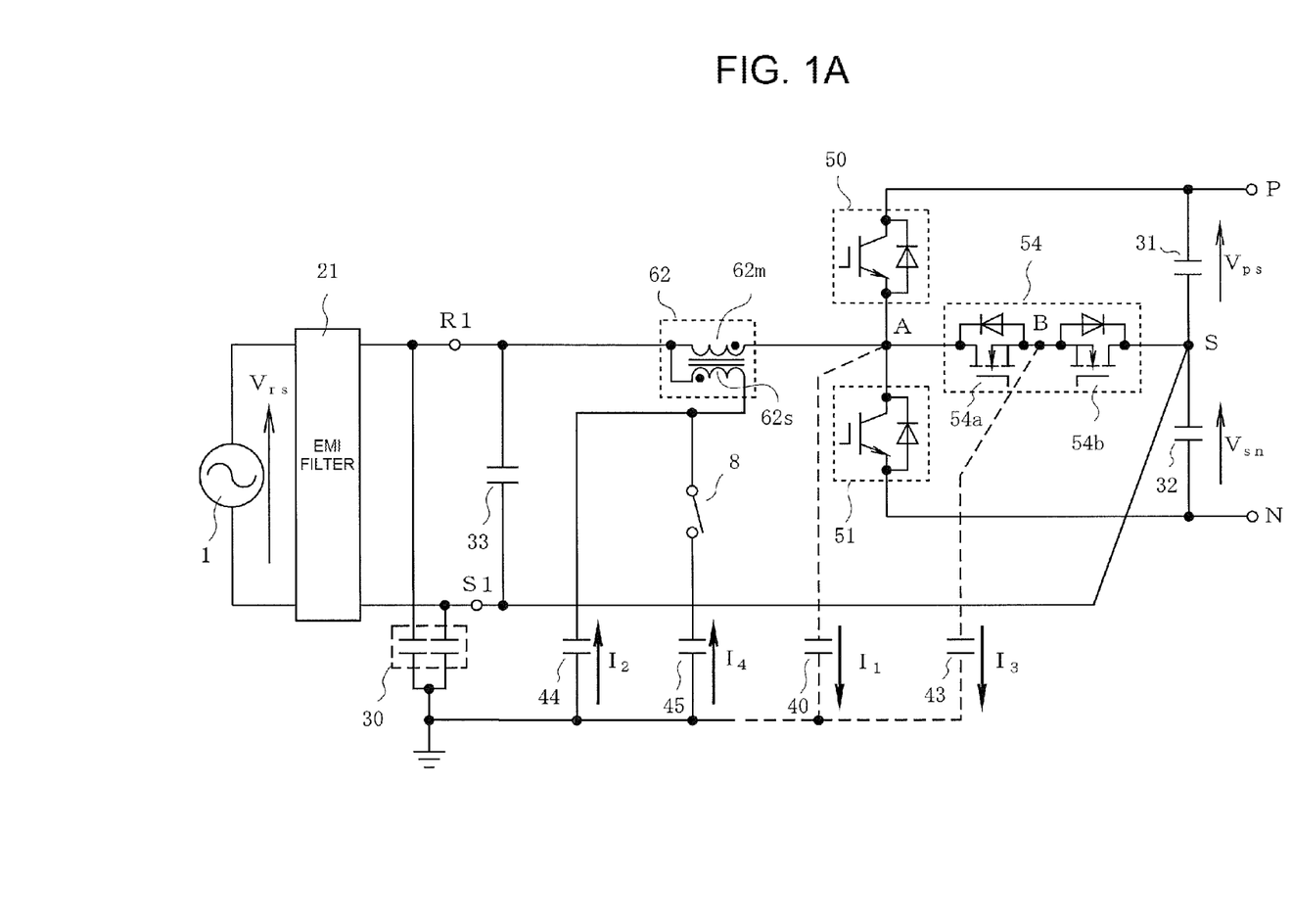
FIG. 1A is a circuit diagram showing a first embodiment of the invention.

In FIG. 1A, the two ends of a single phase alternating current power source 1 are connected to alternating current input terminals R1 and S1 via an EMI filter 21. A ground capacitor 30 is connected between the alternating current input terminals R1 and S1 and a ground point. Also, a capacitor 33 is connected between the alternating current input terminals R1 and S1.

The alternating current input terminal R1 is connected to an A point, which is the connection point of semiconductor switching elements 50 and 51, via a main winding 62m of a reactor 62. One end of an auxiliary winding 62s provided in the reactor 62 is connected to one end on the alternating current input terminal R1 side of the main winding 62m, and the other end of the auxiliary winding 62s is grounded via a compensating ground capacitor 44. Furthermore, the other end of the auxiliary winding 62s is grounded via the series circuit of a switch 8 and compensating ground capacitor 45. Herein, the main winding 62m and the auxiliary winding 62s are connected so that the induced voltages are opposite in polarity.

The main circuit configuration of an AC-DC converter is the same as in FIG. 8. That is, the series circuit of capacitors 31 and 32 is connected in parallel to the series circuit of the switching elements 50 and 51, and a bidirectional switch 54 in which semiconductor switching elements 54a and 54b, such as low breakdown voltage MOSFETs, are connected in anti-series, is connected between an S point, which is the connection point of the capacitors 31 and 32, and the A point (the connection point of the two switching elements 54a and 54b is taken as a B point).

Reference numeral 40 represents a parasitic capacitance between the A point and the ground point, 43 is a parasitic capacitance between the B point and the ground point, and a P point and an N point are direct current output terminals.

Herein, the A point corresponds to a first connection point in Claims, the B point to a second connection point, the ground capacitor 44 to a first ground capacitor, the ground capacitor 45 to a second ground capacitor, the parasitic capacitance 40 to a first parasitic capacitance, and the parasitic capacitance 43 to a second parasitic capacitance.

Also, the ground capacitors 44 and 45 and the reactor 62 make up a voltage potential variation suppression portion, or a voltage potential variation suppression device as recited in Claims. The switch 8 may also make up the potential variation suppression device, as discussed below. However, it is noted that the potential variation suppression device is not limited to the specific examples described herein, which are provided byway of providing examples of devices for suppression voltage potential variations and not by way of limiting the scope of the invention to the examples expressly provided. Alternate embodiments in which reactors, capacitors, and switches are arranged between the described connection points A and B to suppress voltage potential variations are also encompassed within the scope of the present invention.

Figure 1B:
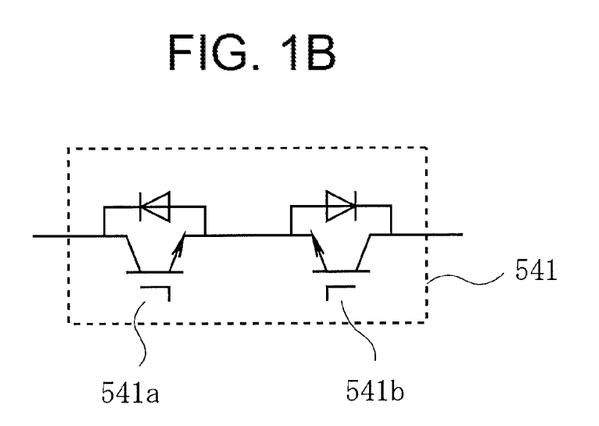
FIG. 1B is another configuration diagram of a bidirectional switch 54 in FIG. 1A.

The configuration of the bidirectional switch is not limited to the example shown in the drawing, and for example, as shown in FIG. 1B, a bidirectional switch 541 may be configured by connecting switching elements 541a and 541b, such as IGBTs, in anti-series.

In the heretofore described configuration, when the turn ratio of the main winding 62m and auxiliary winding 62s of the reactor 62 is taken to be N:1, the induced voltage in the auxiliary winding 62s is 1/N of that in the main winding 62m. Also, it is taken that the capacitance values of the ground capacitors 44 and 45 satisfy the following conditions.

Firstly, a capacitance value $C_{44}$ of the ground capacitor 44 when the switch 8 is turned off when an alternating current input voltage $V_{rs}$ is positive is taken to be Expression 1.

$$C_{44} = N \times C_{40} \quad \text{[Expression 1]}$$

$C_{40}$ is the capacitance value of the parasitic capacitance 40.

Also, the sum of the capacitance value $C_{44}$ of the ground capacitor 44 and a capacitance value $C_{45}$ of the ground capacitor 45 when the switch 8 is turned on when the alternating current input voltage $V_{rs}$ is negative is taken to be Expression 2.

$$C_{44} + C_{45} = N \times C_{40} + N \times C_{43} \quad \text{[Expression 2]}$$

$C_{43}$ is the capacitance value of the parasitic capacitance 43.

Consequently, as a voltage opposite in polarity to that in the main winding 62m is applied to the auxiliary winding 62s when the alternating current input voltage $V_{rs}$ is positive, a compensating current $I_2$ opposite in direction to a leakage current $I_1$ from the A point flows through the ground capacitor 44. Also, when the alternating current input voltage $V_{rs}$ is negative, the compensating current $I_2$ opposite in direction to the leakage current $I_1$ flows through the ground capacitor 44 in the same way as previously described, and in addition, by turning on the switch 8, a compensating current $I_4$ opposite in direction to a leakage current $I_3$ from the B point flows through the ground capacitor 45.

Also, as the induced voltage in the auxiliary winding 62s is $(-\Delta V/N)$ when it is taken that a variation of the induced voltage in the main winding 62*m* is ΔV, the leakage currents $I_1$ and $I_3$ and the compensating currents $I_2$ and $I_4$ are expressed by Expression 3 to Expression 6.

$$\text{Leakage current } I_1 = C_{40} \times \Delta V \quad \text{[Expression 3]}$$

$$\text{Leakage current } I_3 = C_{43} \times \Delta V \quad \text{[Expression 4]}$$

$$\text{Compensating current } I_2 = -C_{44} \times \Delta V/N = N \times C_{40} \times \Delta V/N = C_{40} \times \Delta V \quad \text{[Expression 5]}$$

$$\text{Compensating current } I_4 = -C_{45} \times \Delta V/N = N \times C_{43} \times \Delta V/N = C_{43} \times \Delta V \quad \text{[Expression 6]}$$

In this way, the leakage current $I_1$ and compensating current $I_2$ are equal in size and opposite in direction, respectively, to the leakage current $I_3$ and compensating current $I_4$. Consequently, the previously described actions of the auxiliary winding 62*s* and ground capacitors 44 and 45 cancel a high frequency leakage current generated by switching of the switching elements 50 and 51 and bidirectional switch 54, thus enabling a reduction in disturbance voltage.

The number of turns of the auxiliary winding 62*s* may be two or more, but only has to be reduced to a minimum of one in order to simplify the structure. When the number of turns of the auxiliary winding 62*s* is two or more, the conditions in Expressions 7 and 8 only have to be satisfied.

$$C_{40} \times N_1 = C_{44} \times N_2 \quad \text{[Expression 7]}$$

$$C_{43} \times N_1 = C_{45} \times N_2 \quad \text{[Expression 8]}$$

In the heretofore described Expressions 7 and 8, $N_1$ is the number of turns of the main winding 62*m*, and $N_2$ is the number of turns of the auxiliary winding 62*s*.

Figure 2:
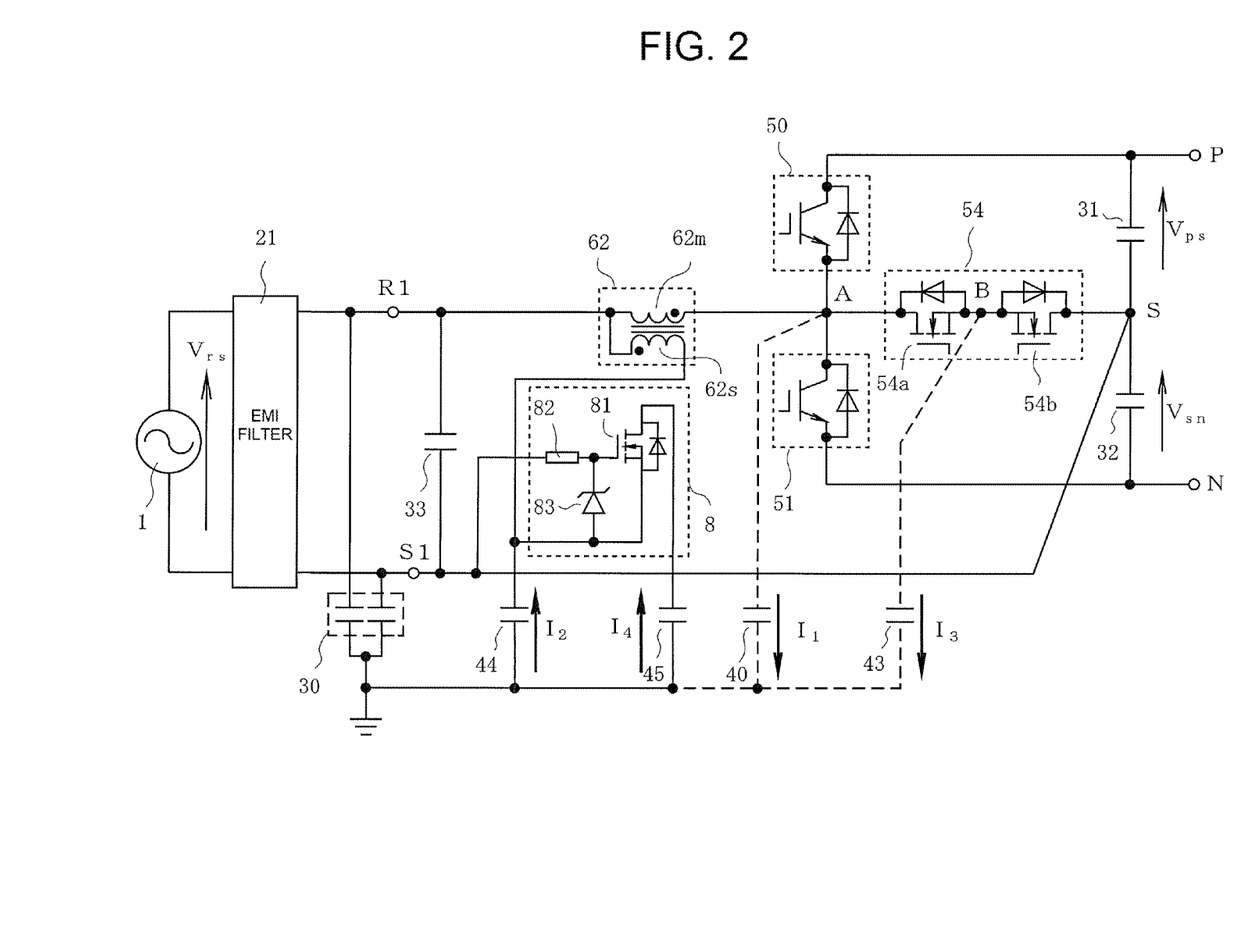
FIG. 2 is a circuit diagram embodying a switch 8 in FIG. 1A.

Next, FIG. 2 is a circuit diagram embodying the switch 8 in FIG. 1A.

In FIG. 2, the switch 8 is configured of a semiconductor switching element 81, a resistance 82 connected between the gate of the switching element 81 and the alternating current terminal S1, and a Zener diode 83 connected between the gate of the switching element 81 and one end of the ground capacitor 44. Herein, as the switching element 81, an IGBT may be used apart from the MOSFET shown in the drawing.

According to the switch 8 of the heretofore described configuration, when the alternating current input voltage $V_{rs}$ is negative, the switching element 81 turns on, the ground capacitor 45 is connected to the circuit, and the compensating current $I_4$ flows. Also, when the alternating current input voltage $V_{rs}$ is positive, the switching element 81 turns off, and the discharge path of the ground capacitor 45 is cut off, meaning that the compensating current $I_4$ does not flow.

According to the switch 8, there is no need for a control circuit, and the configuration is simple. The Zener diode 83 is for preventing an overvoltage being applied to the gate of the switching element 81.

Figure 3:
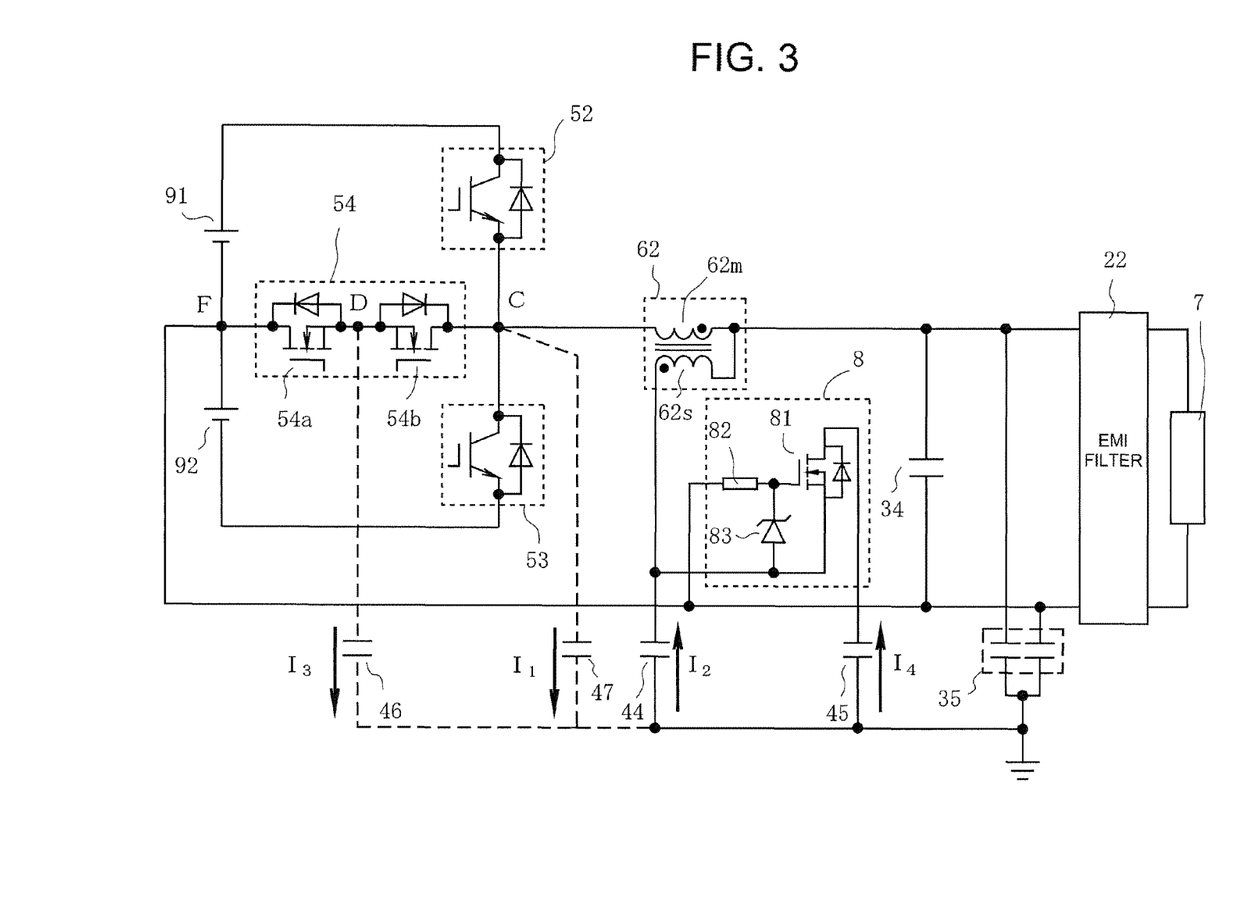
FIG. 3 is a circuit diagram showing a second embodiment of the invention.

Next, a description will be given, while referring to FIG. 3, of a second embodiment of the invention. FIG. 3 is a circuit diagram of a three-level DC-AC converter (a three-level inverter), which generates an alternating current voltage from three direct current potentials. In FIG. 3, parts having the same functions as in FIGS. 1A and 2 are given the same reference signs.

To give a description of the configuration of the three-level inverter, the series circuit of switching elements 52 and 53 is connected in parallel to the series circuit of direct current power sources 91 and 92. Also, the bidirectional switch 54 is connected between an F point which is the connection point of the direct current power sources 91 and 92 and a C point which is the connection point of the switching elements 52 and 53. The connection point of switching elements 54*a* and 54*b* in the bidirectional switch 54 is taken to be a D point. Herein, the switching elements 54*a* and 54*b* may be not only MOSFETs but also IGBTs.

The C point is connected to one end of the main winding 62*m* of the reactor 62, and the other end of the main winding 62*m* is grounded via the series current of the auxiliary winding 62*s* and ground capacitor 44. In the same way as previously described, the main winding 62*m* and the auxiliary winding 62*s* are connected so that the induced voltages are opposite in polarity.

Also, the switch 8 and the ground capacitor 45 are connected in series between the connection point of the auxiliary winding 62*s* and ground capacitor 44 and a ground point.

A capacitor 34 is connected between the connection point of the main winding 62*m* and auxiliary winding 62*s* and the F point. A ground capacitor 35 is connected between the two ends of the capacitor 34 and the ground point, and a load 7 is connected across the capacitor 34 via an EMI filter 22.

Herein, the C point corresponds to the first connection point in Claims, the D point to the second connection point, the ground capacitor 44 to the first ground capacitor, the ground capacitor 45 to the second ground capacitor, a parasitic capacitance 47 to the first parasitic capacitance, and a parasitic capacitance 46 to the second parasitic capacitance.

The three-level inverter is such that the voltage between the C point and the F point changes between the positive voltage of the direct current power source 91, the negative voltage of the direct current power source 92, and 0 [V] by a switching operation of the switching elements 52 and 53 and bidirectional switch 54. Therefore, by pulse width modulation controlling the switching elements 52 and 53 and bidirectional switch 54, it is possible to supply a sinusoidal alternating current voltage to the load 7.

In the circuit of FIG. 3, the patterns of potential variations at the C point and D point differ in accordance with the polarity of an output voltage. Consequently, in the same way as in the first embodiment, a leakage current $I_1$ flowing through the parasitic capacitance 47 due to the potential variation at the C point can be cancelled by a compensating current $I_2$ flowing through the ground capacitor 44 when the output voltage is positive, and the leakage current $I_3$ flowing through the parasitic capacitance 46 due to the potential variation at the D point can be cancelled by the compensating current $I_4$ flowing through the ground capacitor 45 when the output voltage is negative and the switching element 81 turns on.

Figure 4:
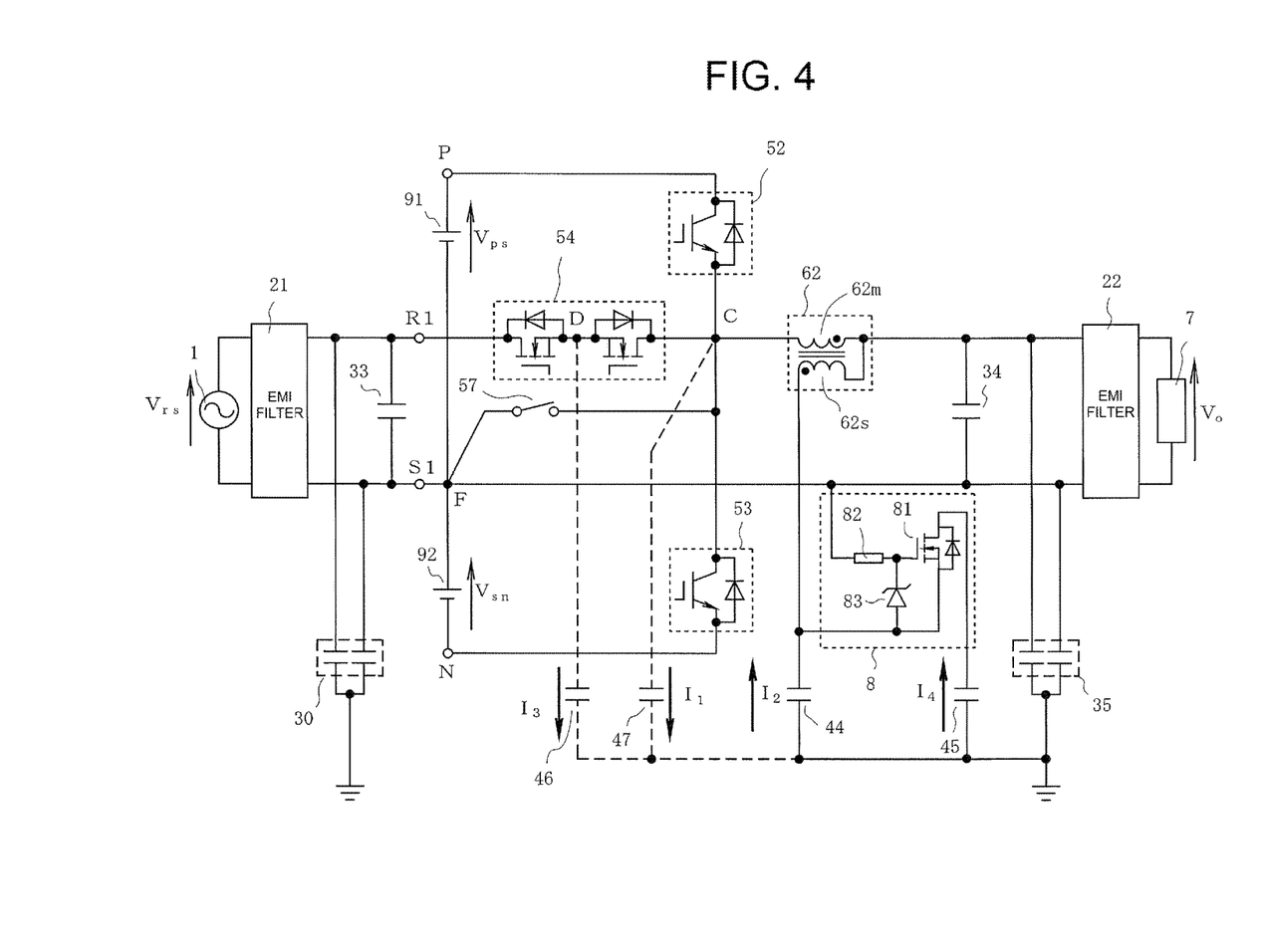
FIG. 4 is a circuit diagram showing a third embodiment of the invention.

Next, a description will be given, while referring to FIG. 4, of a third embodiment of the invention. FIG. 4 is a circuit diagram of a four-level AC-AC converter (a four-level inverter).

In FIG. 4, parts having the same functions as in FIGS. 1A, 2, and 3 are given the same reference signs. That is, the configuration in the stage before alternating current input terminals R1 and S1 is the same as in FIGS. 1A and 2, while the configuration in the stage after a C point and F point is the same as in FIG. 3.

Hereafter, a description will be given centered on portions different from in FIGS. 1A, 2, and 3.

The alternating current input terminal R1 is connected to the C point, which is the connection point of the switching elements 52 and 53, via the bidirectional switch 54. On the other hand, the alternating current input terminal S1 is connected to the F point which is the connection point of the direct current power sources 91 and 92.

Also, a switch 57 which turns off when outputting an alternating current input voltage $V_{rs}$ is connected between the F point and the C point.

In the same way as previously described, the bidirectional switch 54 may be configured by connecting two IGBTs in anti-series.

Herein, in the same way as in the second embodiment, the C point corresponds to the first connection point in Claims, a D point to the second connection point, the ground capacitor 44 to the first ground capacitor, the ground capacitor 45 to the second ground capacitor, the parasitic capacitance 47 to the first parasitic capacitance, and the parasitic capacitance 46 to the second parasitic capacitance.

In the four-level inverter, four voltages: voltages $V_{ps}$, $V_{pn}$, and 0 [V] of the direct current power sources 91 and 92 and the alternating current input voltage $V_{rs}$ are combined by an operation of the switching elements 52 and 53, bidirectional switch 54, and switch 57, thus generating an alternating current voltage $V_o$.

In the circuit of FIG. 4 too, the patterns of potential variations at the C point and D point differ in accordance with the polarity of an output voltage. Consequently, in the same way as in the first and second embodiments, the leakage current $I_1$ flowing through the parasitic capacitance 47 due to the potential variation at the C point can be cancelled by the compensating current $I_2$ flowing through the ground capacitor 44 when the output voltage is positive, and the leakage current $I_3$ flowing through the parasitic capacitance 46 due to the potential variation at the D point can be cancelled by the compensating current $I_4$ flowing through the ground capacitor 45 when the output voltage is negative and the switching element 81 turns on.

The previously described first embodiment is an example of a single phase converter which converts a single phase alternating current voltage to a multilevel direct current voltage, and the second and third embodiments are examples of a single phase inverter which converts a multilevel voltage including a direct current voltage to a single phase alternating current voltage, but the invention can also be applied to each of a three-phase converter and three-phase inverter.

REFERENCE SIGNS LIST

1: SINGLE PHASE ALTERNATING CURRENT POWER SOURCE
7: LOAD
8: SWITCH
21, 22: EMI FILTER
30, 35: GROUND CAPACITOR
31, 32, 33: CAPACITOR
41, 44, 45: CAPACITOR
40, 43, 46, 47: PARASITIC CAPACITANCE
50, 51, 52, 53: SEMICONDUCTOR SWITCHING ELEMENT
54, 541: BIDIRECTIONAL SWITCH
54a, 54b, 541a, 541b: SEMICONDUCTOR SWITCHING ELEMENT
57: SWITCH
62: REACTOR
62m: MAIN WINDING
62s: AUXILIARY WINDING
81: SEMICONDUCTOR SWITCHING ELEMENT
82: RESISTANCE
83: ZENER DIODE
91, 92: DIRECT CURRENT POWER SOURCE
R1, S1: ALTERNATING CURRENT INPUT TERMINAL
P, N: DIRECT CURRENT OUTPUT TERMINAL

The invention claimed is:

1. A power conversion device, comprising:
first and second semiconductor switching elements connected together at a first connection point;
third and fourth semiconductor switching elements connected together at a second connection point, the first, second, third, and fourth semiconductor switching elements configured to convert power from a power source and to supply the power to a load;
a voltage potential variation suppression device configured to suppress voltage potential variations at the first connection point and the second connection point, the voltage potential variation suppression device comprising a reactor, a first ground capacitor and a second ground capacitor, the reactor including a main winding connected to the first connection point, and an auxiliary winding connected to the first and second ground capacitors, the main winding and the auxiliary winding being configured such that a voltage in the main winding generates an induced voltage in the auxiliary winding having a polarity opposite from the voltage in the main winding, the reactor and the first ground capacitor being connected between the first connection point and ground, the reactor and the second ground capacitor being connected between the second connection point and ground, wherein
the voltage potential variation suppression device is configured to suppress the voltage potential variations at the first connection point by cancelling a first leakage current, which flows to a ground point from the first connection point via a parasitic capacitance due to the voltage potential variation at the first connection point at first and second opposing polarities of an alternating current voltage, with a first compensating current flowing via the reactor and the first ground capacitor connected to the first connection point, and
the voltage potential variation suppression device is configured to suppress the voltage potential variations at the second connection point by cancelling a second leakage current, which flows to the ground point from the second connection point via a parasitic capacitance due to the voltage potential variation at the second connection point at the second polarity of the alternating current voltage, with a second compensating current flowing via the reactor and the second ground capacitor.

2. The power conversion device according to claim 1, wherein the third and fourth semiconductor switching elements are connected in anti-series to form a bidirectional switch, the second connection point located between the third and fourth semiconductor switching elements, and
the first connection point connected to one of the third and fourth semiconductor switching elements.

3. The power conversion device according to claim 2, wherein
the voltage potential variation suppression device includes a switch, through which the auxiliary winding is connected to the second ground capacitor, and
the switch is configured to open based on a voltage of the first polarity of the alternating current voltage applied to the first connection point and to close based on a voltage of the second polarity of the alternating current voltage applied to the first connection point.

4. The power conversion device according to claim 2, wherein the first to fourth semiconductor switching elements perform a switching operation to convert an alternating current voltage to a direct current voltage.

5. The power conversion device according to claim 2, wherein the first to fourth semiconductor switching elements perform a switching operation to convert a direct current voltage to an alternating current voltage.

6. The power conversion device according to claim 2, wherein the first to fourth semiconductor switching elements perform a switching operation to convert an alternating current voltage to an alternating current voltage of a different magnitude.

7. The power conversion device according to claim 1, wherein
the voltage potential variation suppression device further includes a switch, through which the auxiliary winding is connected to the second ground capacitor, and
the switch is configured to open based on a voltage of the first polarity of the alternating current voltage applied to the first connection point and to close based on a voltage of the second polarity of the alternating current voltage applied to the first connection point.

8. The power conversion device according to claim 7, wherein the switch is a fifth semiconductor switching element configured to open and close in accordance with the polarity of the induced voltage in the auxiliary winding.

9. The power conversion device according to claim 1, wherein the first to fourth semiconductor switching elements perform a switching operation to convert an alternating current voltage to a direct current voltage.

10. The power conversion device according to claim 1, wherein the first to fourth semiconductor switching elements perform a switching operation to convert a direct current voltage to an alternating current voltage.

11. The power conversion device according to claim 1, wherein the first to fourth semiconductor switching elements perform a switching operation to convert an alternating current voltage to an alternating current voltage of a different magnitude.

12. The power conversion device according to claim 3, wherein
each of the main winding and the auxiliary winding has a first end and a second end,
the first end of the main winding is connected to the first connection point,
the second end of the main winding is connected to the first end of the auxiliary winding, and
the second end of the auxiliary winding is connected to the first ground capacitor, and to the second ground capacitor via the switch.

13. The power conversion device according to claim 7, wherein
each of the main winding and the auxiliary winding has a first end and a second end,
the first end of the main winding is connected to the first connection point,
the second end of the main winding is connected to the first end of the auxiliary winding, and
the second end of the auxiliary winding is connected to the first ground capacitor, and to the second ground capacitor via the switch.

* * * * *